JOHN P. SCHRODT
DAVID N. CRAIG
GEORGE W. VINAL
INVENTORS

Patented June 1, 1948

2,442,380

UNITED STATES PATENT OFFICE 2,442,380

METHOD AND SYSTEM FOR WARMING DRY BATTERIES

John P. Schrodt, David N. Craig, and George W. Vinal, Washington, D. C.

Application February 25, 1942, Serial No. 432,276

8 Claims. (Cl. 136—161)

(Granted under the act of March 3, 1883, as amended April 30, 1928; 370 O. G. 757)

The invention herein described may be manufactured and used by or for the Government of the United States for governmental purposes without the payment to us of any royalty thereon in accordance with the provisions of the act of April 30, 1928, (Ch. 460, 45 Stat. L. 467).

This invention relates to rendering batteries serviceable when subjected to extreme low temperature, and aims generally to provide method and apparatus for accomplishing this end.

In a scientific paper (Scientific Papers, Bureau of Standards 17, p. 627, 1922, No. 434) published by the Bureau of Standards in 1922, it was shown that dry batteries become unserviceable at temperatures of −21° C. (−6° F.) and below. Subsequent work has confirmed this conclusion and it applies to the larger sizes as well as to the small batteries used in the earlier experiments.

At the present time there is need for dry batteries to operate both military and civil equipment under conditions that may expose the batteries to temperatures of −50° to −60° C. (−58° to −76° F.). In some services it is possible to prolong the time that the batteries are serviceable by the use of thermal insulation. This expedient does not provide a satisfactory method for protecting the batteries during long exposure, nor does it provide for restoring batteries to a serviceable operating temperature. It is the purpose of this invention in its method aspect to provide a method of maintaining dry batteries at operating temperatures indefinitely when exposed to extreme low temperatures and also to provide a method for quickly restoring batteries to normal operating temperatures during or after exposure to chilling. This method employs facilities which can usually be supplied on airplanes or other mobile equipment as well as at base stations.

The method of keeping dry batteries in serviceable condition when they are in environments of extreme low temperatures, in accordance with this invention, consists essentially in maintaining the interior of the individual cells at a suitable temperature by virtue of heat developed internally within the cells by passage of an alternating current through the batteries. Using this method the heat is developed where it is most effective and the method is superior therefore to any form of external heating. The ordinary battery terminals are utilizable for the A.-C. heating circuit and no change in the design of the battery or its assembly need be made.

The invention further contemplates methods and apparatus for blocking discharge of the batteries through the A.-C. heating circuit. Several methods of so blocking the discharge of the batteries may be used including the use of (a) condensers, (b) counter electromotive forces which may be provided either by an external battery or by opposing one half of the battery to the other half or (c) by the use of any automatic circuit arrangement which passes alternating current while at the same time impeding the flow of direct current.

In the accompanying drawing showing illustrative arrangements according to and for practicing the invention:

Fig. 1 is a diagram of one embodiment of battery treating circuit; while

Figure 1:
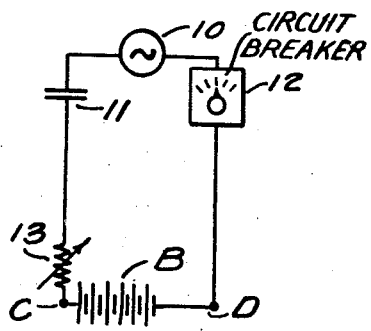

In the form shown in Fig. 1, the battery B, having terminals C and D, is connected for A.-C. internal heating in series with a source of alternating current 10 and means for blocking the flow of direct current, herein the condenser 11. Any source of A.-C. current may be used, such as an ordinary 110 v.-60 cycle line; a local transformer; an induction coil; an A.-C. generator, wind driven or otherwise; and the condenser 11 may be the smaller, the higher the frequency of the source 10. As an additional feature, if desired, an overload circuit breaker 12, preferably adjustable as shown, may be included to open the A.-C. heating circuit when the internal resistance of battery B to alternating current falls off to the value indicating the attainment of room temperature or a desired slightly higher temperature. In addition, if desired, the circuit may include a fixed, changeable, or variable resistance 13 to limit the A.-C. current flow. Such resistor, if used, should preferably have a value small compared to the internal resistance of battery B when chilled, and relatively large compared to such internal resistance when warmed. The voltage drop across the resistor 13 may be connected, if desired, to operate an indicator or automatic circuit breaker. In the form shown in Fig. 2, the battery B is connected in series with a source 10 of A.-C. heating current and with means in the form of a bucking battery 11a, for preventing discharge of the battery B during heating. The elements 12 and 13 may be used as in Fig. 1, if desired.

Figure 3:
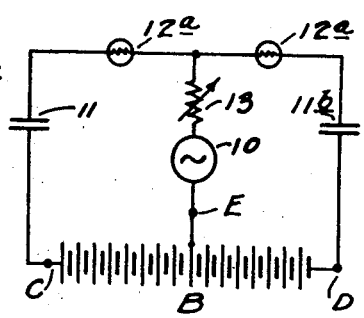

In the form shown in Fig. 3, the battery B is center tapped at E and the A.-C. source 10 is connected to the center tap and to the two end terminals of battery B through condensers 11 and 11b. This arrangement of the two halves of the battery in parallel in the A.-C. supply, reduces the resistance in the A.-C. heating circuit and therefore increases the heating current, as compared with the arrangement of Fig. 1, in which all the internal resistance of the battery is in series with the A.-C. source. Automatic circuit breaking means, shown as fuses 12a, 12a, and the limiting resistor 13, may be used if desired, in this as in any of the other forms shown. The use of two fuses 12a in the relation shown, instead of a single fuse in the lead between the source 10 and terminal E, is advantageous to insure full heating of both halves of the battery in the event the heating of one half lags with respect to the other.

Figure 4:
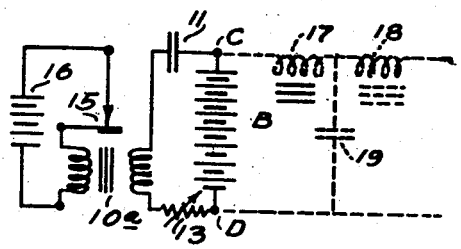

In the form shown in Fig. 4, the battery B is connected through condenser 11 to the secondary of an induction coil 10a, the primary of which is connected in series with a suitable interrupter 15 and a source of current, such as dry cells, 16. This figure also shows in dotted lines, a filter circuit, exemplified by choke coils 17, 18 and bypass condenser 19, which may be connected between the battery terminals C and D and any load it is desired to feed with direct current stripped of A.-C. components, while the battery B is being subject to A.-C. heating. Such an arrangement might be used where the batteries had to be left permanently in circuit in a cold environment, but could be visited at frequent intervals with a heating set or a warm battery 16.

Figure 5:
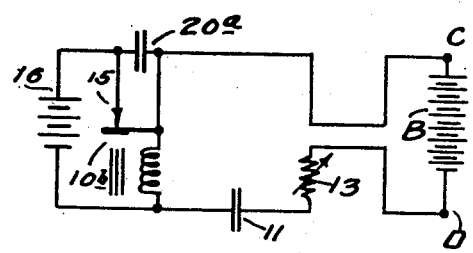

Fig. 5 shows an arrangement similar to Fig. 4, but using an auto-transformer-, or buzzer-type of A.-C. source 10b, and showing the usual condenser 20a connected across the interrupter.

Figure 2:
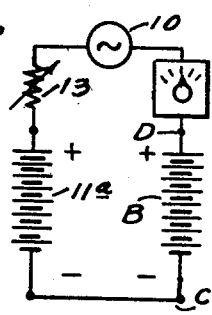
Figs. 2 to 8 are diagrams of modified embodiments.
Figure 6:
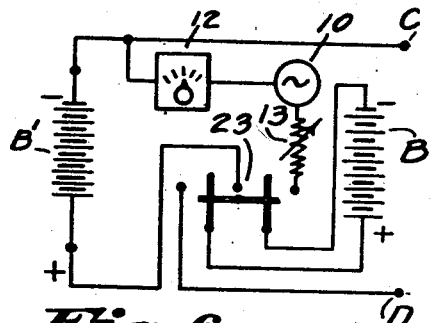

In Fig. 6, the arrangement is similar to that of Fig. 2, but the battery to be treated is in two sections B and B¹, arranged to be connected in series with battery terminals C, D, or in bucking relation in series with A.-C. source 10, by means of the two-position change-over switch 23.

Figure 7:
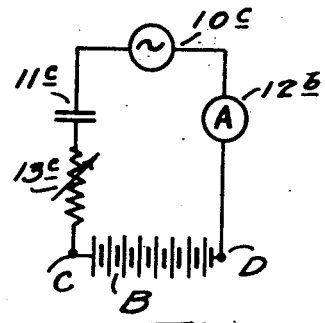

In Fig. 7, the arrangement is generally similar to that in Fig. 1, but an A.-C. ammeter 12b is employed to indicate when the internal resistance of battery B has been restored to its normal value by internal heating. Here the A.-C. source 10c delivers, preferably, a predetermined A.-C. voltage, and the resistor 13c is chosen such that $R_C + R_{BN} = K$ (in which $R_C$ is the resistance of 13c and $R_{BN}$ is the resistance of the battery B at normal temperature, say 25° C). While theoretically it may be desirable to choose the condenser 11c such that $(C_{11} \times C_{BN})/(C_{11} + C_{BN}) = k$ (in which $C_{11}$ is the capacity of condenser 11 and $C_{BN}$ the internal capacity, at normal temperature, of the battery acting as a condenser) this does not seem to be a necessity.

From a practical standpoint, it has been found that while the 60 cycle A.-C. and the D.-C. resistances of the dry batteries, as measured by high-grade meters are not exactly equal, the A.-C. values being somewhat less than the corresponding values of D.-C. resistance calculated from flash currents, both the A.-C. and the D.-C. resistances increase in substantially the same ratio when the temperature of the cells in the battery is decreased from customary room temperatures to temperatures approaching —50° C. (—58° F.). This fact indicates that the behavior of the dry batteries subjected to the method of A.-C. heating can be considered substantially on the basis of their changing resistance with temperature and that the selection of a condenser to block the discharge of the cells is not critical provided it is capable of passing A.-C. currents of sufficient magnitude to produce the desired effect. With this arrangement heating of the battery to its normal operating temperature may be indicated by the obtaining of a predetermined reading of the ammeter 12b. In this form the resistance 13c may be termed a complementary resistance, and, as in the case of Fig. 1, will preferably have a value within the range of warm and cold A.-C. internal resistances of the battery B.

Figure 8:
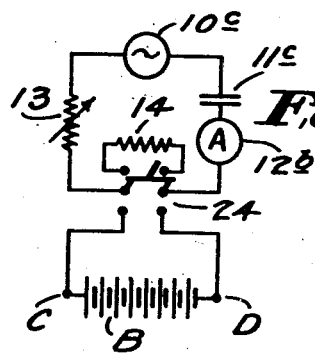

In Fig. 8 the arrangement is again similar to Fig. 1, and again employs an A.-C. ammeter 12b to indicate completion of internal heating of battery B, but here a check impedance 14 is provided substitutable for battery B, as by the double pole double throw switch 24. Here again resistance 13 will preferably have a value between the cold and warm values of internal resistance of the battery, and impedance 14 will have a value equal to the effective impedance of the battery B at 25° C. Thus, with this arrangement one may select the proper impedance 14 and condenser 11c or a relatively large value of condenser, and determine the reading of ammeter 12b for these values; then throw switch 24 and heat battery B until 12b has the same value; and then throw switch 24 back and forth to check the equality of the battery impedance with that of impedance 14. As before the resistance 13 may be used or omitted, its use being preferred to limit the A.-C. current toward the end of the battery heating operation.

Considerable latitude in applying the alternating current is possible. It is not necessary that the voltage of the alternating current supply should equal or exceed the battery voltage. It may be materially less. The wave form of the A.-C. is immaterial. Even the distorted wave form produced by a mechanical interrupter is permissible. Commercial frequencies can readily be used, but higher frequencies are advantageous in permitting smaller condensers to be employed. If commercial power is not available, the alternating current may be supplied by small portable generators of various types.

If the voltage of the alternating current remains practically constant the current through the battery depends substantially entirely on its indicated internal impedance, which in the absence of an intervening discharge, is a function of its temperature. This provides a method of judging and controlling the internal temperature of the battery and its performance. Batteries which are provided with thermal insulation require less alternating current than those without, to keep them in satisfactory operating condition.

The operation of dry batteries in low temperature environments may be accomplished by either of two methods, as is apparent from the above: (1) the supply of a small alternating current continuously to keep the battery active and (2) the supply of a larger current for periods of a few seconds or a few minutes to restore the battery to a serviceable condition. The effectiveness of these methods in maintaining satisfactory battery performance in low temperature environments is illustrated by the results given in the following tables:

Table 1 compares the performance of two similar miniature 45 volt B batteries, labelled "Burgess Y-30" and each comprising 30 tubular $MnO_2$-Zn cells, with the zinc shells ¼" D by ⅝" high, about ⅜" of which height contacts the electrolyte, in an environment of −50 to −60° C. (−58 to −76° F.). The battery designated as No. 1 was not supplied with A.-C. heat. It became unserviceable in about 25 minutes. Battery No. 2, on the other hand, was supplied with an alternating current of about ¼ ampere. Tests made at frequent intervals showed that it maintained satisfactory closed-circuit voltage and flash current throughout the test period of 2½ hours. Except for the initial values at 0 time each voltage and flash current entry in the table is a measured value following discharge of the battery for two minutes through 10,000 ohm resistance. This program of discharges was the subject of investigation at the time but for the purpose of establishing the beneficial effects of the alternating heating current any other program with or without discharges might equally well have been employed.

"B" and "C" battery comprising 81 flat type dry cells having zinc plates about 1" x ⅝":

Table 2

| A.-C. heating applied | Percentage of Flash Current at 28° C. at— | | | | | Remarks |
|---|---|---|---|---|---|---|
| | 1 hour | 2 hours | 3 hours | 4 hours | 6 hours | |
| Amperes | | | | | | |
| 0.00 | 46 | 8 | 0 | ------ | ------ | |
| 0.10 | 64 | 45 | 40 | 35 | 34 | |
| 0.15 | 79 | 70 | 68 | 66 | 66 | |
| 0.20 | 97 | 95 | 94 | 92 | 91 | |
| 0.22 | 100 | 100 | 100 | 100 | 100 | by interpolation. |
| 0.25 | 109 | 115 | 117 | 118 | 117 | |

Table 3 illustrates the possibility of restoring a dry battery which has become unserviceable because of low temperature conditions. For each of the experiments, the battery used was a single "penlight" cell (size AA) namely "Eveready" #915–1.5v, ½" D x 1⅞" height, and was initially at a temperature below −18° C. (0° F.). The condition of the battery is indicated by the low flash currents reported in the first column of the table. In this condition its internal resistance is high and 110 volts A.-C. was applied to the battery terminals. Using the last experiment reported in the table as an illustration, the A.-C. current through the battery increased slowly, requiring 230 seconds to reach a value of 1 ampere. Following this the A.-C. current increased rapidly, requiring only 27 seconds to reach 3.2 amperes at which time the A.-C. current was terminated. It is characteristic of all the experiments with these AA-cells that when the A.-C. current increased to about Table 1

| Elapsed Time | Battery No. 1 without heating | | | Battery No. 2 with A.-C. heating | | | |
|---|---|---|---|---|---|---|---|
| | External Temperature | Voltage[2] | Flash Current | Heat supplied | | Voltage[2] | Flash Current |
| | | | | Time[1] | Current | | |
| Minutes | ° C. | Volts | Amperes | Minutes | Amperes | Volts | Amperes |
| 0 | +25 | 42.9 | ------ | ------ | ------ | 43.5 | ------ |
| 2 | +25 | 41.7 | 0.260 | ------ | ------ | 42.5 | 0.380 |
| 3 | −50 | | | (Both batteries placed in air at −50° C.) | | | |
| | −50 | | | 12 | 0.22 | | |
| 17 | −50 | 32.7 | 0.042 | | | 40.7 | 0.248 |
| | −50 | | | 13 | 0.25 | | |
| 27 | −50 | 26.4 | 0.018 | | | | |
| 32 | −50 | | | | | 40.5 | 0.253 |
| | −50 | | | 13 | 0.32 | | |
| 42 | −50 | 9.8 | 0.002 | | | | |
| 47 | −50 | (Discontinued) | | | | 41.4 | 0.325 |
| | −50 | | | 13 | 0.24 | | |
| 62 | −50 | | | | | 40.1 | 0.248 |
| | −58 | | | 28 | 0.31 | | |
| 92 | −58 | | | | | 40.5 | 0.288 |
| | −59 | | | 58 | 0.27 | | |
| 152 | −59 | | | | | 40.3 | 0.272 |

[1] The A.-C. heating was cut off 2 minutes before readings reported for battery No. 2.
[2] Closed circuit voltage after 2 minutes discharge through 10,000 ohms except initial closed circuit voltage readings at zero time.

Table 2 shows the effect of varying the A.-C. heating current on a small dry battery which was exposed to a temperature of −60° C. (−76° F.). This battery was provided with thermal insulation, but the battery became unserviceable, nevertheless, in about 2 hours when no A.-C. heating was supplied. The same battery, however, maintained reasonable serviceability throughout a test period of 6 hours when heating currents of 0.10 to 0.20 ampere were supplied. By interpolation it is found that a current of 0.22 ampere would maintain the battery at full operating efficiency equal to its performance at room temperature, 28° C. (82° F.). The battery dealt with in Table 2 was a "Minimax" 125 volt one ampere, the time required for a further increase to 3.2 amperes is about 25 seconds irrespective of the previous condition of the battery. The time necessary to restore a chilled battery to a serviceable condition will depend on the initial condition of the battery and the available A.-C. voltage. The experiments show that in the worst case reported in the table the battery can be completely restored in about 250 seconds, but for others the time may be as short as 27 seconds. The indications are that unless the actual battery temperature is below −25° C. (−13° F.) the battery can be restored to serviceable condition in about 1 minute or less.

Table 3

| Flash current as an indication of the condition of the battery | 110-volt A.-C. heating applied¹ | | | | Resulting Flash Current | Remarks |
|---|---|---|---|---|---|---|
| | Current (A.-C.) at— | | Time | | | |
| | Start | Finish | To 1 amp. | Total Time | | |
| Amperes | Amperes | Amperes | Seconds | Seconds | Amperes | |
| 1.25 | | | | | | Initial condition at 28° C. |
| 0.205 | 0.7 | 3.2 | 4 | 27 | 0.95 | Battery chilled to successively lower temperatures. |
| 0.125 | 0.5 | 3.2 | 10 | 36 | 1.06 | |
| 0.090 | 0.2 | 3.0 | 20 | 42 | 0.93 | |
| 0.060 | 0.2 | 3.2 | 25 | 50 | 1.02 | |
| 0.044 | 0.2 | 3.2 | 32 | 58 | 0.98 | |
| 0.029 | 0.2 | 3.0 | 65 | 90 | 0.93 | |
| 0.019 | 0.2 | 3.2 | 67 | 95 | 0.97 | |
| 0.012 | 0.2 | 3.2 | 230 | 257 | 0.96 | |

¹ When the alternating current is first applied, the resistance of the chilled battery is high. The heating current is consequently small, but builds up to 1 ampere in the time shown in column 4, the rate depending on the previous temperature of the battery. After this the current increases rapidly reaching about 3.2 amperes in an average time of 25 seconds regardless of the previous temperature of the battery.

From the foregoing detailed descriptions exemplifying our invention, it is apparent that the invention is not limited to any particular size or character of battery or to the particular embodiments of method and apparatus described.

We claim as our invention:

1. A method of raising the temperature of a pair of batteries to render them serviceable in environments of extreme low temperature, which consists in connecting the two batteries in voltage opposition to one another and passing an alternating current through the two batteries in series.

2. A method of raising the temperature of a center tapped battery to render it serviceable in environments of extreme low temperature, which consists in connecting the two ends of the battery to condensers and passing an alternating current through the condensers and the two halves of the battery in parallel with a return to the center tap of the battery.

3. A method of raising the temperature of a battery to render it serviceable in an environment of extreme low temperature, which consists in connecting a condenser in series with the battery and internally heating the battery by passing an alternating current through the battery and condenser to develop a substantial heating effect internally of the battery.

4. A system for warming batteries to render them serviceable in cold environments, consisting of a circuit for internally heating such batteries comprising a source of alternating current, means for connecting said source to the battery to be heated, and means for blocking any substantial discharge of said battery through said heating circuit comprising a condenser in series with said connecting means.

5. A system for warming batteries to render them serviceable in cold environments, consisting of a circuit for internally heating such batteries comprising a source of alternating current, means for connecting said source to the battery to be heated, and means for blocking any substantial discharge of said battery through said heating circuit comprising a potential source connected in said connecting means substantially equal and opposite to the potential of the battery to be heated.

6. A system for warming batteries to render them serviceable in cold environments, consisting of a circuit for internally heating such batteries comprising a source of alternating current, means for connecting said source to the battery to be heated, and means for blocking any substantial discharge of said battery through said heating circuit comprising a second battery to be heated similar to and connected in voltage opposition to the first named battery.

7. A system for warming batteries to render them serviceable in cold environments, consisting of a circuit for internally heating such batteries comprising a source of alternating current, means for connecting said source to the battery to be heated, means for blocking any substantial discharge of said battery through said heating circuit, and a limiting resistance in series with said connecting means having a value between those equivalent to the chilled and warmed internal resistances of the battery to be heated.

8. A system for warming center tapped batteries to render them serviceable in environments of extreme low temperature, consisting of a circuit for internally heating such batteries comprising a source of alternating current, means for connecting one side of said source to a center tap on said battery, and connections, each including a condenser, for connecting the other side of said source to the respective end terminals of said battery.

JOHN P. SCHRODT.
DAVID N. CRAIG.
GEORGE W. VINAL.

REFERENCES CITED

The following references are of record in the file of this patent:

UNITED STATES PATENTS

| Number | Name | Date |
|---|---|---|
| 982,493 | Hickley | Jan. 24, 1911 |
| 1,266,780 | Edison | May 21, 1918 |
| 1,650,470 | Salles | Nov. 22, 1927 |
| 1,974,187 | Malpass | Sept. 18, 1934 |
| 2,157,139 | Mirick | May 9, 1939 |

FOREIGN PATENTS

| Number | Country | Date |
|---|---|---|
| 26,688 | Great Britain | 1905 |

OTHER REFERENCES

Vinal, G. W., Storage Batteries, 2nd Ed. (1930), Page 269.